United States Patent [19]

Abbestam et al.

[11] Patent Number: 5,211,279
[45] Date of Patent: May 18, 1993

[54] LINEAR CONVEYING UNIT

[75] Inventors: Göran Abbestam; Ake Alstmar, both of Partille; Leif Lachonius, Surte; Torbjörn Lövgren, Kode, all of Sweden

[73] Assignee: SKF Specialty Products AB, Gothenburg, Sweden

[21] Appl. No.: 865,484

[22] Filed: Apr. 9, 1992

[30] Foreign Application Priority Data

Apr. 9, 1991 [SE] Sweden ................ 9101060

[51] Int. Cl.$^5$ ............................................ B65G 25/00
[52] U.S. Cl. .................................... 198/750; 198/748; 384/55; 384/57
[58] Field of Search ............... 198/747, 748, 750, 838, 198/845, 860.5; 384/55, 57, 58

[56] References Cited

U.S. PATENT DOCUMENTS

| | | | |
|---|---|---|---|
| 2,525,712 | 10/1950 | Neighbour | 384/55 |
| 2,918,333 | 12/1959 | Friedman | 384/55 X |
| 2,997,346 | 8/1961 | Beninger et al. | 384/55 |
| 3,427,080 | 2/1969 | Folk | 384/55 |
| 4,044,886 | 8/1977 | Sender | 198/750 X |
| 4,656,881 | 4/1987 | Godecke et al. | 384/55 X |
| 4,715,730 | 12/1987 | Magnuson | 384/57 X |
| 4,867,579 | 9/1989 | Gallone | 384/55 X |
| 4,884,898 | 12/1989 | Magnuson | 384/57 X |
| 5,054,605 | 10/1991 | Bavis | 198/750 |

FOREIGN PATENT DOCUMENTS 3132869 3/1983 Fed. Rep. of Germany ........ 384/57
3336496 8/1989 Fed. Rep. of Germany .

*Primary Examiner*—Robert P. Olszewski
*Assistant Examiner*—James R. Bidwell
*Attorney, Agent, or Firm*—Burns, Doane, Swecker & Mathis

[57] ABSTRACT

A linear conveying unit comprises a rail and a saddle movable therealong. The rail includes two pairs of tracks, with the tracks of each pair being convergent. The saddle carries front and rear groups of wheels for engaging the tracks. Each wheel group includes two pairs of wheels, each pair of wheels having convergent axes of rotation. To adjust the saddle in order to eliminate any gaps between the wheels and tracks, only one wheel of each wheel group is made to be radially adjustable. That adjustment is effected by an eccentric sleeve surrounding the wheel axle. The saddle is moved by a drive belt, the ends of which are connected to the saddle by quick-release couplings. The saddle includes a recess which is covered by a metallic tape that is magnetically attracted to a pair of magnetic rims.

17 Claims, 3 Drawing Sheets

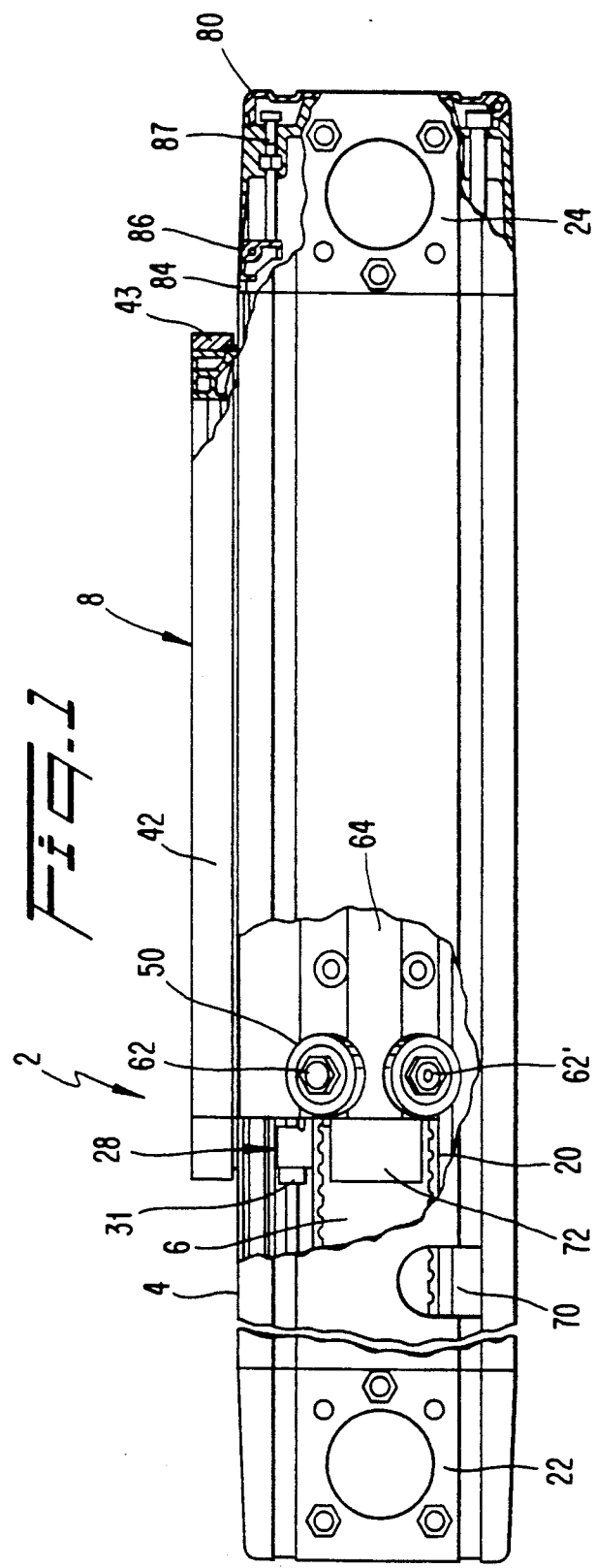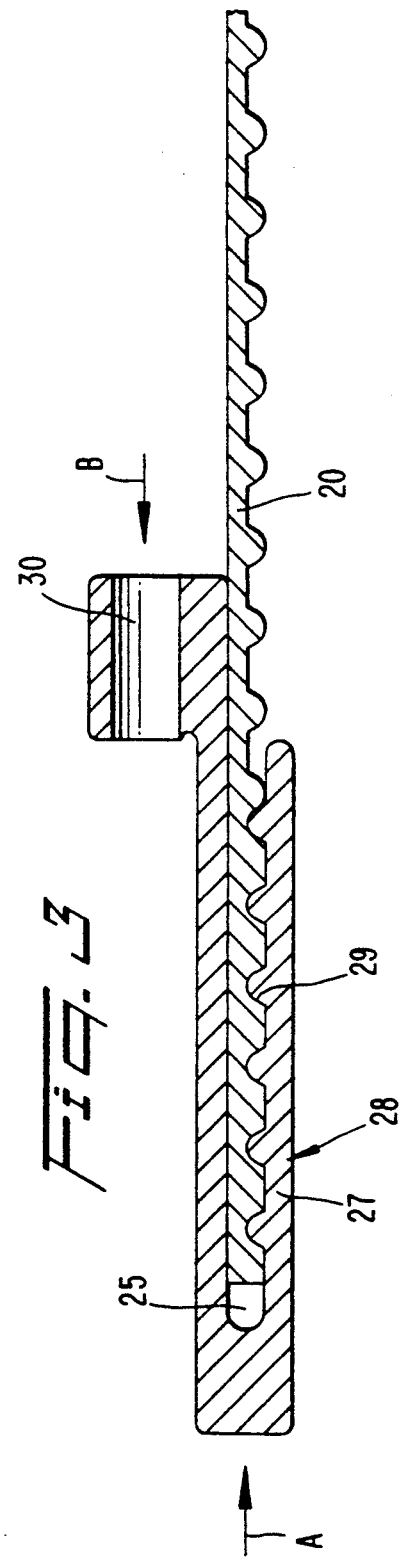

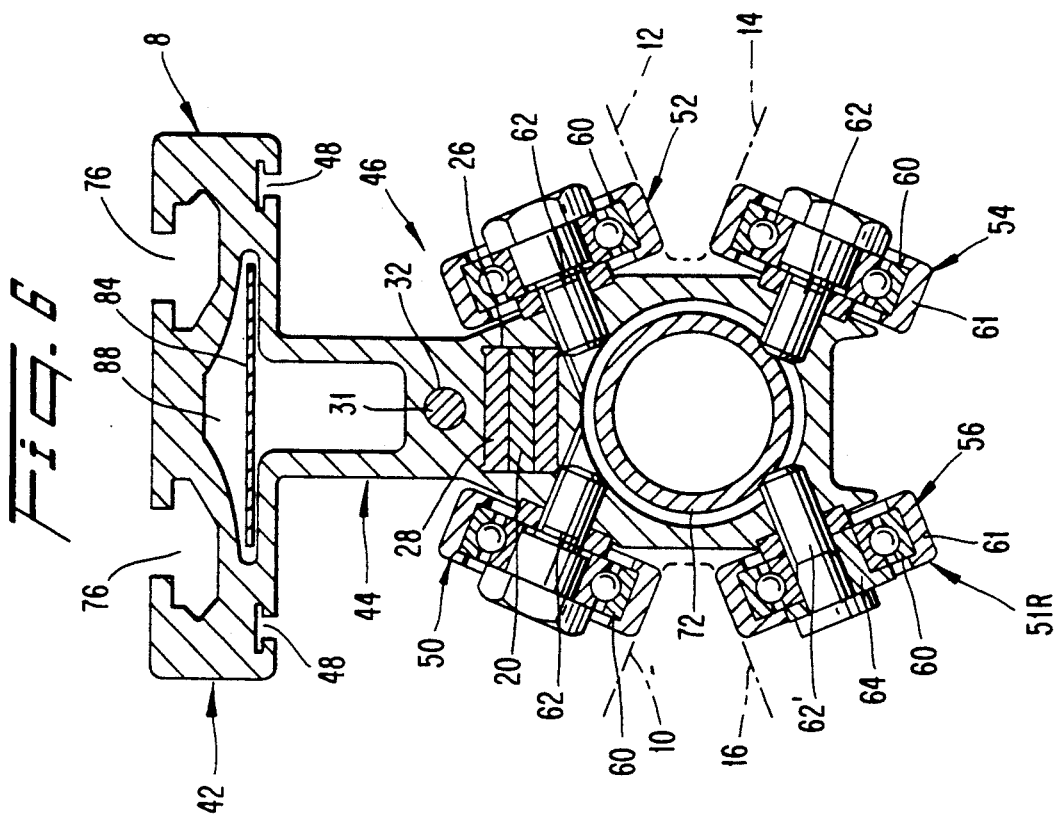
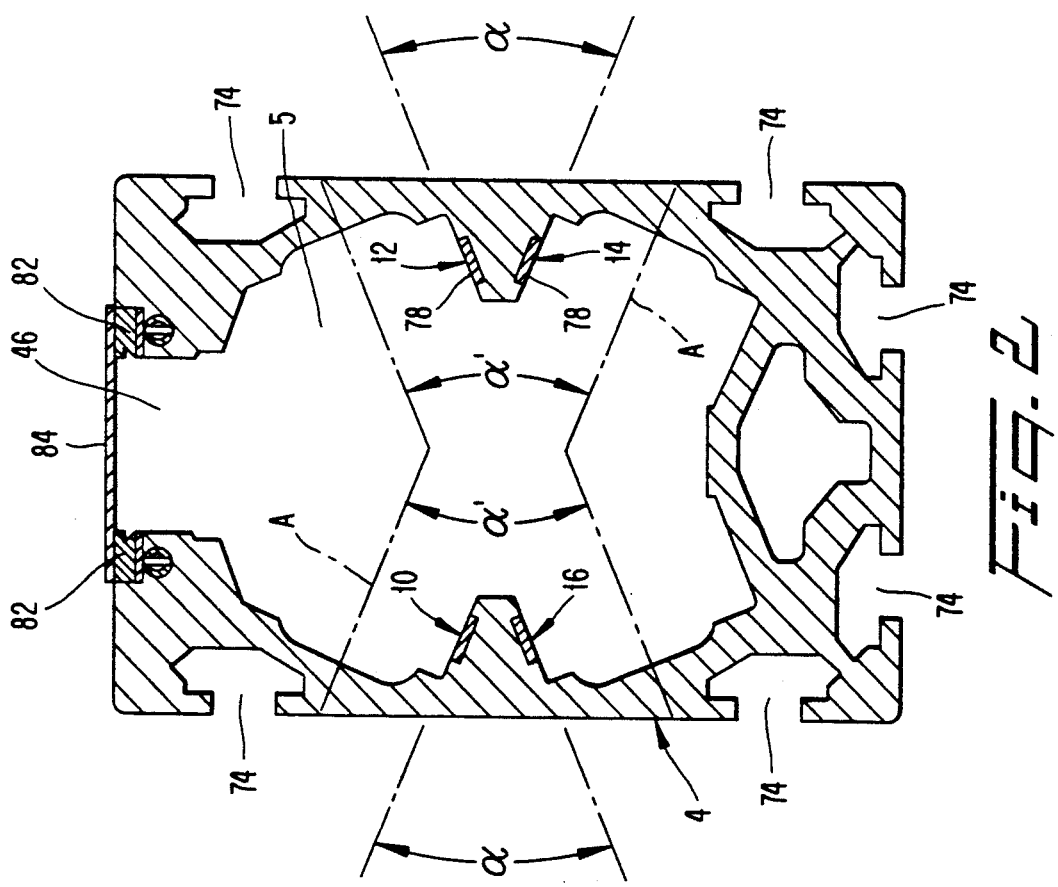

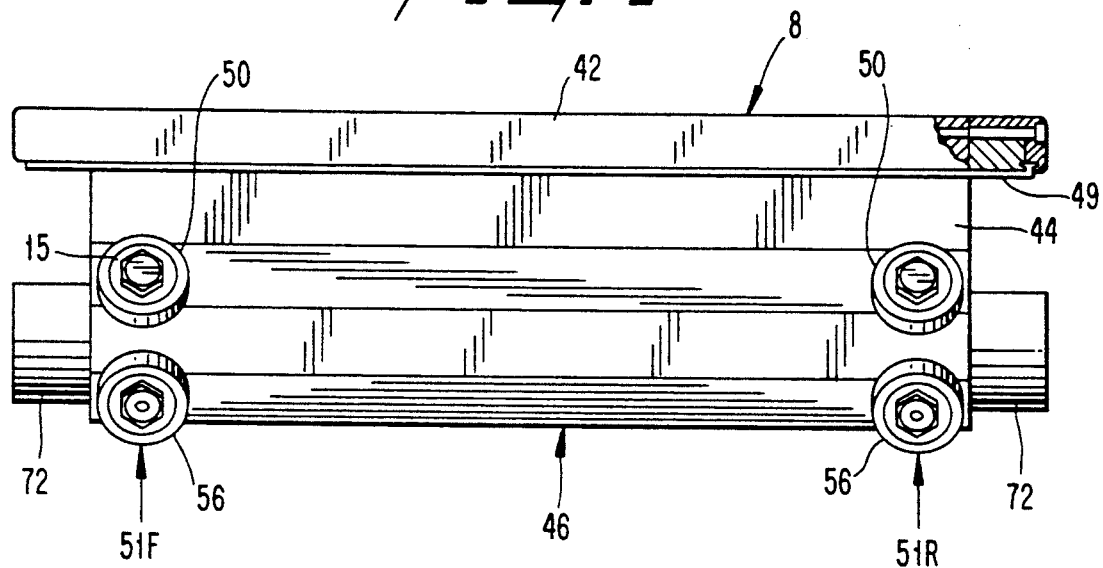
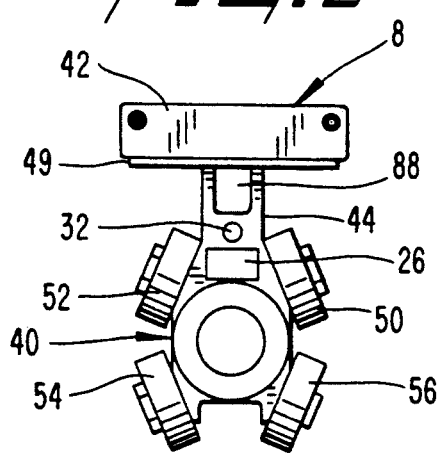

LINEAR CONVEYING UNIT

BACKGROUND OF THE INVENTION

The present invention relates to a linear conveying unit for transferring items and, in particular, to a saddle which moves linearly along a track.

Such a conveying unit may include a tubular bar having a longitudinal opening or channel along which the saddle is linearly movable, preferably by using a motor to drive a toothed belt or a screw for example in a manner known per se. The saddle is equipped with at least two groups of wheels placed at opposite ends of the saddle, the wheels of each group lying in a common plane oriented perpendicular to the longitudinal direction of the saddle. The wheels engage linear tracks formed by the bar.

Such linear conveying units are widely used to transport products, machine parts or the like from one place to another, in horizontal, vertical or inclined directions.

It is necessary to ensure that gaps do not exist between the wheels and tracks, e.g., by adjusting the wheels or tracks. Such adjustments have proven to be complicated and time-consuming. For example Folk U.S. Pat. No. 3,427,080 discloses the use of a wedge which is displaceable to adjust a track toward and away from the wheels located on one side of the saddle. Such a mechanism is cumbersome and complicated.

German DE-C-33 36 496 illustrates a saddle having front and rear groups of wheels oriented such that the wheel axes of each group lie in a common plane oriented perpendicular to the saddle axis. The planes of the front and rear groups are mutually parallel. To eliminate the gap between the wheels and the track, each wheel is provided with its own individual eccentric adjustment mechanism. However, this individual adjustment is time-consuming and requires that each adjustment device be accessible from the outside of the rail in order to enable the adjustment to be made.

In Beninger et al U.S. Pat. No. 2,997,346, individually adjustable wheels are mounted on the bar rather than on the saddle. However, such an arrangement can be prohibitively expensive if a large number of wheels are required. Also, if the wheels are not similarly adjusted operational difficulties can result, as noted above.

In many instances, prior art arrangements require that the saddle and/or bar be partially dismantled in order to effect an adjustment of the wheels. Since the conveying units may consist of many different parts, it may be necessary to dismantle a plurality of parts when adjusting a wheel or a notched belt. This is unacceptably time-consuming, especially since the wheel adjustments themselves are rather simple.

SUMMARY OF THE INVENTION

The present invention involves a linear conveying unit which comprises a linear rail forming first and second pairs of longitudinal tracks disposed on first and second opposing sides of the rail, respectively. The tracks of the first pair of tracks form a first angle therebetween and converge toward the second side of the rail. The tracks of the second pair of tracks form a second angle therebetween and converge toward the first side of the rail. The first and second angles are substantially equal. A saddle is mounted for movement along the rail and includes front and rear groups of wheels. Each group of wheels comprises first and second pairs of wheels disposed on the first and second sides of the rail, respectively. The wheels of the first pair of wheels are rotatable on respective axles which form a third angle between one another and which converge toward the second side of the rail. The wheels of the second pair of wheels are rotatable on respective axles which form a fourth angle between one another and which converge toward the first side of the rail. The second and third angles are substantially equal to one another and to the first and second angles. Only one wheel of each front and rear groups of wheels is adjustable radially for eliminating gaps between the wheels and tracks. Preferably, the adjustable wheel of the front group of wheels is located on the same side of the rail as the adjustable wheel of the rear group of wheels, and most preferably the adjustable wheels engage the same track of the rail.

Another aspect of the invention involves a linear conveying unit comprising a rail, a saddle movable along the rail, and a toothed belt having opposite ends connected to the saddle by respective connectors. The belt is driven to displace the saddle along the rail. Each connector forms a slot having an open end. A wall of the slot is toothed to mesh with teeth of the belt when the belt is inserted into the slot. A portion of the connector which forms the slot is insertable into an aperture formed in the saddle. A fastener is provided for fastening the connector to the saddle.

Another aspect of the invention involves a linear conveying unit comprising a linear rail forming tracks. A saddle is mounted for movement along the tracks. The rail includes a longitudinal recess extending therethrough. A pair of rims is located on the rail on opposite sides of the recess. A tape extends across the recess and is magnetically attached to the rims. The tape passes through an aperture in a portion of the saddle which extends through the recess. The rims are preferably formed of a magnetic material, and the tape formed of a magnetically attractive material.

BRIEF DESCRIPTION OF THE DRAWINGS

The objects and advantages of the invention will become apparent from the following detailed description of a preferred embodiment thereof in connection with the accompanying drawings in which like numerals designate like elements, and in which:

FIG. 1 is a side elevational view of a linear conveying unit according to the present invention, with portions of a rail component thereof being broken away;

FIG. 2 is a cross-sectional view through the rail component;

FIG. 3 is a longitudinal sectional view through a belt connector according to the present invention, with a belt mounted therein;

FIG. 4 is a side elevational view of a saddle component of the present invention;

FIG. 5 is an end view of the saddle component shown in FIG. 4; and

FIG. 6 is a cross-sectional view taken through the saddle component, with track portions of the rail being depicted in phantom.

DETAILED DESCRIPTION OF A PREFERRED EMBODIMENT OF THE INVENTION

A linear conveyor unit 2 comprises a rail 4 (see FIG. 2) of generally U-shape and forming an internal channel 5 therein. A saddle 8 is slidably disposed within the channel 5 for movement therealong (see FIG. 6). The rail 4 and saddle 8 can be formed of any suitably rugged material such as cast or extruded aluminum for example.

The rail 4 forms a plurality of longitudinal tracks 10, 12, 14, 16 which are arranged in pairs 10, 16 and 12, 14, respectively, located on opposite sides of the rail. That is, the first pair of tracks 10, 16 is located on the left-hand side of the rail, and the second pair of tracks 12, 14 is located on the right-hand side of the rail. The tracks of each pair converge toward the opposite side of the rail (i.e., the tracks 10, 16 converge to the right, and the tracks 12, 14 converge toward the left in FIG. 2). The tracks of each pair form an angle $\alpha$, preferably in the range of 30 to 120 degrees, e.g., 46 degrees, with the angle $\alpha$ of both pairs of tracks being equal.

Disposed within the channel 5 is a toothed drive belt 20 which extends around gears (not shown) rotatably mounted to end brackets 22, 24 of the rail 4. One of the gears is motor-driven to drive the belt 20. The belt can be formed of any suitable material, such as carbon steel coated with plastic, for example.

The saddle 8 includes a longitudinal recess 26 extending therethrough (see FIG. 6). Each end of that recess receives a connector 28 (only one connector being shown in FIG. 1) to connect opposite ends of the belt 20 to the saddle. Each connector includes a slot 25 (see FIG. 3) which is open at one end and also open at least at one side. A wall of the slot includes ribs or teeth 29 which mesh with the teeth of the belt 20 when the belt has been inserted laterally through the open side of the slot. Then, the connector is inserted into the recess 26 in the direction of arrow A and secured in place by means of a bolt 31 which extends in the direction of arrow B through a collar 30 of the connector and is threaded into a hole 32 formed in the saddle. By adjusting the bolt, the connector can be pulled farther into the recess to vary the belt tension.

The saddle 8 includes a lower part 40, an upper part 42, and an intermediate part 44 which extends through a groove 46 formed in an upper wall of the rail 4. The recess 26 and hole 32 are formed in the intermediate part 44.

The upper part 42 rides along the outside of the rail and includes grooves 48 in which brushes 49 are mounted for the purpose of resisting the entry of dust into the channel 6. Front and rear ends of the upper part 42 are covered by removable covers 43 which permit the brushes to be removed and exchanged.

Mounted to the lower portion 40 of the saddle are front and rear groups 51F, 51R of wheels. Each wheel group includes four wheels 50, 52, 54, 56. The wheels are arranged in pairs 50, 56 and 52, 54 located on opposite sides of the rail. That is, the first pair of wheels 50, 56 is located on the left-hand side, and the second pair of wheels 52, 54 is located on the right-hand side of the rail when viewed in FIG. 6. The wheels are mounted on axles 62 such that the axles of each pair of wheels converge toward the opposite side of the rail and form an angle $\alpha'$ which is substantially equal to the angle $\alpha$. The wheels 50-56 thus tend to engage the tracks 10-16, respectively.

Each wheel comprises a bearing 60 around which a plastic cover 61 could be molded. The axles 62 comprise bolts which secure the wheels to the saddle. Thus, bolts 62 secure the wheels to the saddle. One of the bolts 62', which secures the wheel 56 to the saddle, constitutes part of an adjusting mechanism for that wheel 56, as will be later explained. The wheel 56 thus constitutes an adjustable wheel.

The bolt 62' carries an eccentric adjusting sleeve 64 such that when the bolt 62' is rotated, the eccentric sleeve 64 is also rotated. In so doing, the adjustable wheel 56 is displaced radially (with reference to its axle) in order to eliminate any gaps which may exist between the wheels 50-56 on the one hand and the respective tracks 10-16 on the other hand.

For example, with reference to FIG. 6, by rotating the eccentric sleeve 64 of the wheel 56 of the rear group of wheels in such a direction that the wheel 56 is moved toward and into engagement with its respective track 16, and then continuing to rotate the sleeve 64 in that same direction, the saddle will be caused to rotate in a counterclockwise direction. Consequently, the other wheel 50 of the pair of wheels 50, 56 is caused to approach and engage its respective track 10. Hence, no gaps now exist between the wheels 50 and 56 and their respective tracks 10, 16. If a gap still exists between either or both of the wheels 52, 54 and their respective tracks, then the sleeve 64 is rotated still farther in the same direction. As a consequence, the wheels 50, 56 will be caused to slide downwardly along their respective tracks 10, 16, thereby displacing the rear end of the saddle laterally toward the right so that the other pair of wheels 52, 54 engage their tracks 12, 14.

Thus, it will be appreciated that by continuously rotating the sleeve 64 in a given direction, all of the wheels 50-56 of a given wheel group will eventually be brought into engagement with their respective tracks so that no gaps exist. By performing the same operation on the adjustable wheel of the front group 51F, a similar lateral shifting of the front end of the saddle will tend to occur.

Thus, it becomes possible to adjust the saddle by merely adjusting one wheel of each group of wheels. This is much less burdensome and time-consuming than adjusting every wheel in each group of wheels. The benefits of the invention can be achieved even if the adjustable wheel of one group does not coincide with the adjustable wheel of the other group, e.g., if wheel 54 of one group and wheel 50 of the other group constituted the adjustable wheels.

Additional benefits may result, however, if the adjustable wheel of one group is on the same side (right or left) of the rail as the adjustable wheel of the other group(s). In that case, it is ensured that the lateral movement occurring at opposite ends of the saddle will be in the same direction to minimize any lateral (right-to-left) offset between the front and rear ends of the saddle. It should be noted that slight amounts of offset can be tolerated. By shifting the ends of the saddle in the same lateral direction, the occurrence of such a relative offset could be completely avoided.

Most preferably, the wheels chosen as the adjusting wheels for the front and rear groups of wheels would be the same wheels, i.e., wheels which engage the same track (i.e., wheels 56 constitute adjustable wheels in both the front and rear groups in the disclosed embodiment). This will facilitate access to the bolt 62' of the adjustable wheels. In that regard, the rail 4 is provided with an aperture 70 (see FIG. 1) through which the wheel 56 of each wheel group is accessible from the outside. Thus, by positioning the saddle so that the wheels 56 of the front and rear groups are successively aligned with the aperture 70, those wheels 56 can be successively adjusted. Hence, the provision of only a single aperture would be required. If desired, a removable cover can be provided for the aperture 70.

Disposed at each end of the saddle is a damper or bumper formed of a hollow tube 72 of elastic material such as rubber. The tube 72 extends through a longitudinal bore of the saddle (see FIG. 6) and is held in place by contact with at least some of the bolts 62, 62'.

The external walls of the rail 4 can be provided with longitudinal grooves 74 (see FIG. 2) to enable the rail to be mounted as a machine part of a larger machine. Also, the afore-mentioned optional cover for the aperture 70 could be slidably mounted in one of the grooves 74. Similar grooves 76 are provided on an upper surface of the saddle 8.

Front and rear ends of the rail 4 are covered by hingedly mounted covers 80 which afford access to the adjustable bolts 31 and 87.

The wheels 50-56 can run directly upon surfaces defined by the body of the rail, or alternatively, on steel bands 78 (see FIG. 2) which are embedded in that body. The bands 78 could have a dove-tail cross-sectional shape to prevent being dislodged.

The rail 4 has two grooves in its top surface which carry a pair of magnetic rims 82 (see FIG. 2) on opposite sides of the groove 46. A magnetically attractive metallic sealing tape 84 covers the groove 46 by being magnetically attracted to the magnetic rims 82. Opposite ends of the tape 84 are attached to the rail 4. As depicted in FIG. 1, each end of the tape is clamped between a respective end bracket 22 or 24 and a pivotably mounted clamp 86. The clamp 86 is pushed toward that bracket by means of a screw 87. The tape 84 thus prevents dirt from entering the recess 46. The tape 84 extends through a channel 88 formed in the saddle to enable the tape to be raised off the magnetic rims 82 as the saddle traverses the rail.

It will be appreciated that the linear conveyor unit according to the present invention enables the saddle to be quickly and effectively adjusted to eliminate gaps between the wheels and tracks. Also, a quick coupling is provided for securing the drive belt to the saddle, and for adjusting the belt tension. The tape which is magnetically attached to cover the recess of the rail resists the entry of dirt.

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A linear conveying unit comprising:
   a linear rail forming first and second pairs of longitudinal tracks disposed on first and second opposing sides of said rail, respectively;
   said tracks of said first pair of tracks forming a first angle therebetween and converging toward said second side of said rail;
   said tracks of said second pair of tracks forming a second angle therebetween and converging toward said first side of said rail;
   said first and second angles being substantially equal to one another;
   a saddle mounted for movement along said rail and including front and rear groups of wheels, each group of wheels comprising first and second pairs of wheels disposed on said first and second sides of said rail, respectively;
   said wheels of said first pair of wheels being rotatable on respective axles which form a third angle between one another and which converge toward said second side of said rail;
   said wheels of said second pair of wheels being rotatable on respective axles which form a fourth angle between one another and which converge toward said first side of said rail;
   said second and third angles being substantially equal to one another and to said first and second angles; and
   drive means for moving said saddle along said rail;
   only one wheel of each of said front and rear groups of wheels being adjustable radially for eliminating gaps between said wheels and said tracks.

2. A linear conveying unit according to wherein said adjustable wheel of said front group of wheels being located on the same side of said rail as said adjustable wheel of said rear group of wheels.

3. A linear conveying unit according to claim 2, wherein said adjustable wheel of said front group of wheels engages the same track as said adjustable wheel of said rear group of wheels.

4. A linear conveying unit according to claim 1, wherein each of said adjustable wheels includes an adjusting sleeve mounted eccentrically relative to its respective axle, so that rotation of said adjusting sleeve produces said radial adjustment of said adjustable wheel.

5. A linear conveying unit according to claim 4, wherein said rail includes a side wall having an aperture therein for accessing said adjusting sleeves.

6. A linear conveying unit according to claim 1, wherein each of said first, second, third and fourth angles lies in the range of 30 to 120 degrees.

7. A linear conveying unit according to claim 1, wherein each of said wheels is mounted on a bearing and secured by a bolt which defines an axle.

8. A linear conveying unit according to claim 1, wherein said drive means incudes a belt attached to said saddle and means for revolving said belt, said belt including teeth, a connector including a slot having an open end through which one end of said belt extends, a wall of said slot having teeth meshing with said teeth on said belt, the slot-forming portion of said connection being mounted in a recess formed in said saddle.

9. A linear conveying unit according to claim 1, wherein said wheels are secured to said saddle by bolts which from said axles, said saddle forming an internal space, a flexible bumper mounted in said internal space and projecting from a respective end of said saddle, inner ends of said bolts entering said internal space to secure said bumper in place.

10. A linear conveying unit according to claim 1, wherein said rail includes a longitudinal groove formed in an outer surface thereof, a portion of said saddle extending through said groove, a pair of rims disposed on opposite sides of said groove, a tape extending over said groove and magnetically adhered to said rims, said saddle including a channel through which said tape extends.

11. A linear conveying unit according to claim 10, wherein said rims are formed of a magnetic material and said tape is formed of a magnetically attractive material.

12. A linear conveying unit according to claim 1, wherein said tracks are formed by steel bands mounted on said rail.

13. A linear conveying unit comprising a rail; a saddle movable along the rail; and a toothed belt having opposite ends connected to said saddle by respective connecting means; said belt being driven to displace said saddle along said rail; each connecting means comprising a connector forming a slot having an open end, a wall of said slot being toothed to mesh with teeth of said belt when said belt is inserted into said slot; a portion of said connector forming said slot being insertable into an aperture formed in said saddle; and fastener means for fastening said connector to said saddle.

14. A linear conveying unit according to claim 13, wherein said fastener is operable to control the depth of insertion of said slot-forming portion within said aperture to adjust the tension of said belt.

15. A linear conveying unit according to claim 13, wherein said slot includes an open side through which said belt is inserted into said slot.

16. A linear conveying unit comprising a linear rail forming tracks; a saddle mounted for movement along said tracks; said rail including a longitudinal recess extending therethrough; a pair of rims located on said rail on opposite sides of said recess; and a tape extending across said recess and magnetically attached to said rims, said tape passing through an aperture in a portion of said saddle which extends through said recess.

17. A linear conveying unit according to claim 16, wherein said rims are formed of a magnetic material, and said tape is formed of a magnetically attractive material.

* * * * *